US006557520B2

(12) United States Patent
Roberts, Jr.

(10) Patent No.: US 6,557,520 B2
(45) Date of Patent: May 6, 2003

(54) MULTI-ZONE COMBUSTION CHAMBER AND METHOD FOR COMBUSTION CONTROL IN COMPRESSION-IGNITED RECIPROCATING ENGINES

(75) Inventor: Charles E. Roberts, Jr., San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 09/941,788

(22) Filed: Aug. 30, 2001

(65) Prior Publication Data

US 2003/0041836 A1 Mar. 6, 2003

(51) Int. Cl.⁷ .................................................. F02F 3/26
(52) U.S. Cl. ........................ 123/276; 123/279; 123/260
(58) Field of Search ................................. 123/276, 268, 123/274, 275, 285, 292, 253, 256, 279, 260, 261, 264, 269

(56) References Cited

U.S. PATENT DOCUMENTS

| | | | |
|---|---|---|---|
| 2,234,844 A | | 3/1941 | Mitchell |
| 2,696,808 A | | 12/1954 | Chronic et al. |
| 3,386,422 A | | 6/1968 | Eyzat |
| 3,402,704 A | | 9/1968 | Witzky et al. |
| 4,164,915 A | | 8/1979 | Kulhavy et al. |
| 4,669,433 A | * | 6/1987 | Hpooie et al. ............... 123/276 |
| 5,009,207 A | * | 4/1991 | Merritt ........................ 123/276 |
| 5,060,609 A | | 10/1991 | Merritt |
| 5,083,530 A | * | 1/1992 | Rassey ...................... 123/51 R |
| 5,195,486 A | | 3/1993 | Ishii |
| 6,032,617 A | | 3/2000 | Willi et al. |
| 6,119,650 A | | 9/2000 | Tanigawa et al. |

* cited by examiner

*Primary Examiner*—John Kwon
(74) *Attorney, Agent, or Firm*—Oliff & Berridge, PLC.

(57) ABSTRACT

A multizone combustion chamber and method of combustion in a compression-ignited reciprocating engine. The combustion chamber includes a cylinder, a cylinder head located at one end of the cylinder, a piston that reciprocates in the cylinder, an inlet that supplies a gas into the combustion chamber during an induction stroke of the piston, and an injector that supplies a fuel into the combustion chamber. The combustion chamber defines a primary chamber and at least a secondary chamber when the piston is located in a predetermined position near the cylinder head. Combustion is initiated in the primary chamber while preventing combustion from occurring in the secondary chamber. Combustion in the secondary chamber is delayed until after the piston and the cylinder head have been separated and thermodynamic communication between the fuel/gas mass in the primary chamber and the fuel/gas mass in the secondary chamber is possible.

24 Claims, 4 Drawing Sheets

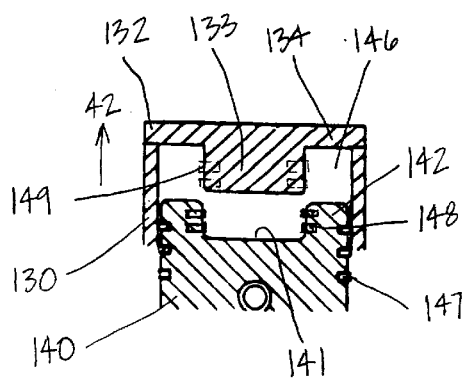
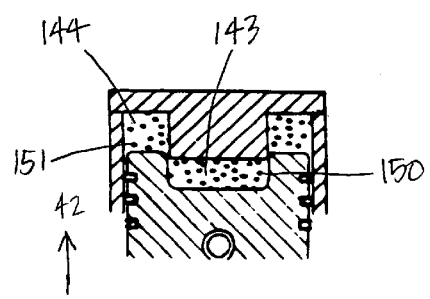
Fig. 2    Fig. 3
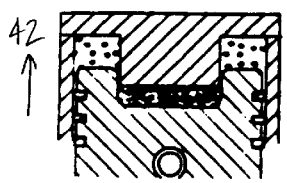
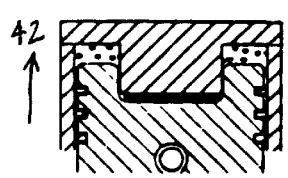
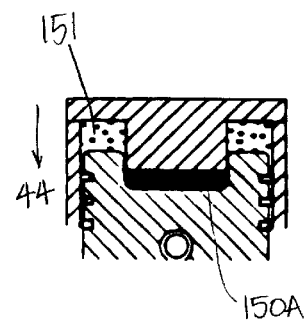
Fig. 4    Fig. 5    Fig. 6
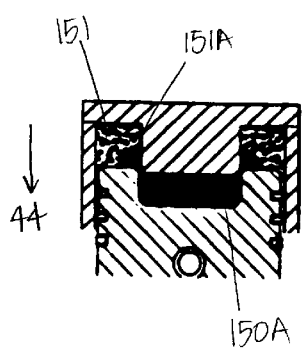
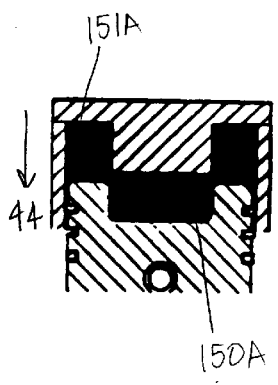
Fig. 7    Fig. 8

MULTI-ZONE COMBUSTION CHAMBER AND METHOD FOR COMBUSTION CONTROL IN COMPRESSION-IGNITED RECIPROCATING ENGINES

BACKGROUND OF THE INVENTION

1. Field of Invention

This invention relates generally to a combustion chamber in an internal combustion engine, and more particularly to providing a multizone combustion chamber in a compression-ignited engine such as, for example, a diesel engine, or a homogeneous charge compression ignition engine (HCCI).

2. Description of Related Art

One type of internal combustion engine is a diesel engine. During operation, air is drawn into a cylinder of the engine and is compressed to a high volume ratio (typically 14:1 to 25:1). As a result, a high temperature of between about 300° C. and 400° C. is obtained. Fuel is not injected into the cylinder until the end of the compression stroke. Because of the high temperature of the air, the fuel ignites spontaneously. However, ignition does not take place immediately after the fuel is injected. The fuel enters the cylinder in the form of liquid droplets. These droplets must mix intimately with the air in the cylinder and vaporize before they can ignite to commence combustion. This inherent delay in combustion renders the combustion process a relatively slow process which is not conducive to complete mixture of fuel, thereby limiting the efficient operation of the diesel engine to relatively low speeds and causing the engine to smoke.

U.S. Pat. No. 2,234,844 to Mitchell, the entire disclosure of which is incorporated herein by reference, discloses a dual chamber combustion chamber segregated by a piston motion, yet allowing pressure equilibrium as the piston approaches top dead center (TDC). Mitchell does not disclose initiating combustion in a primary chamber and delaying combustion in the secondary chamber.

U.S. Pat. No. 4,164,915 to Kulhavy et al., the entire disclosure of which is incorporated herein by reference, discloses a method for converting a gasoline engine to a diesel engine. A piston is provided with a projection that segregates the chamber into two chambers. High velocity flows from a high-pressure chamber to a low-pressure chamber. Kulhavy et al. also does not teach initially combusting in a primary chamber and delaying combustion in a secondary chamber.

U.S. Pat. No. 3,386,422 to Eyzat, the entire disclosure of which is incorporated herein by reference, discloses a compression-ignition engine having a piston projection that forms a variable cross-sectional prechamber flame-jet combustion and increased turbulence. Eyzat also fails to disclose initiating combustion in a primary chamber and delaying combustion in the secondary chamber.

U.S. Pat. No. 2,696,808 to Chronic et al., the entire disclosure of which is incorporated herein by reference, discloses a turbulence chamber for internal-combustion engines having a piston with a projection and a head with a receiver. The combustion chambers are eccentric cylindrical chambers with fuel injection and energy (pre-chamber) targeted for increased turbulent motion. Chronic et al. also does not disclose initiating combustion in a primary chamber and delaying combustion in the secondary chamber.

U.S. Pat. No. 6,119,650 to Tanigawa et al., the entire disclosure of which is incorporated herein by reference, discloses an energy conservation cycle engine having dual chambers with piston projections and head receivers from two chambers at TDC. One-way check valves are provided to allow communication between chambers from a second outer chamber to a first inner chamber. The check valves permit compressed air in the second chamber to be injected into the first chamber during the compression stroke. The fuel is only injected into the first chamber. Tanigawa et al. does not disclose controlling HCCI combustion or the resulting decrease in $NO_x$ due to peak temperature control. Further, Tanigawa et al. does not form an air/fuel mixture in the second chamber prior to combustion.

SUMMARY OF THE INVENTION

It is desirable to provide a multizone combustion chamber that physically segregates the combustion chamber into multiple smaller chambers where at least one of the multiple chambers is a primary combustion chamber. The multizone combustion chamber promotes an increase in the mixture and vaporization of the injected fuel. The multizone combustion chamber also provides different effective compression ratios during the ignition and/or combustion of a reciprocating engine thereby assisting in the control of the combustion process and a reduction in $NO_x$. Segregation of the chambers is obtained when the piston has been moved to a predetermined position that causes the chambers to be sealed off from fluidly communicating with each other. The increased control of the combustion process effectively reduces conventional limits on the efficient operation of the internal combustion engine.

This invention has been made in view of the above circumstances. The present invention addresses the long-standing problems discussed above by providing a multizone combustion chamber and a method for controlling combustion in an internal combustion engine which operate to bring about a desired performance in speed, power output, fuel consumption and exhaust emission of the engine system. Better fuel consumption and reduced emission is obtained because the multizone combustion segregates a combustion chamber into multiple chambers and stages for combustion, thereby fostering homogeneous mixing of fuel with air before the air-fuel mixture is ignited by compression.

One aspect of this invention is to provide a multizone combustion chamber in an internal combustion engine. The multizone combustion chamber includes a cylinder, a cylinder head located at one end of the cylinder, a piston that reciprocates in the cylinder, and an inlet that supplies fuel, air or a combination thereof into the combustion chamber during an induction stroke of the piston. Additionally, an injector may be included that supplies a fuel directly into the combustion chamber. The combustion chamber defines a primary chamber and a secondary chamber when the piston has been moved to a predetermined position near the cylinder head. The primary and secondary chambers contain respective mixtures of the gas and the fuel prior to combustion. The primary and secondary chambers are sized such that compression combustion is initiated in the primary chamber by compression of the gas/fuel mixture therein, while simultaneous initiation of compression combustion does not occur in the secondary chamber due to compression of the gas/fuel mixture in the secondary chamber.

Another aspect of this invention is to provide a method for combustion in an internal combustion engine having a combustion chamber. The multizone combustion chamber includes a cylinder, a cylinder head located at one end of the cylinder, a piston that reciprocates in the cylinder, and an inlet that supplies fuel, air or a combination thereof into the combustion chamber during an induction stroke of the piston. Additionally, an injector may be included that supplies a fuel directly into the combustion chamber. The method comprises: (1) segregating the combustion chamber into at least two sub-chambers when the piston has moved to a predetermined position near the cylinder head, (2) initiating compression ignited combustion in one of the sub-chambers that has been sealed off from an adjacent sub-chamber, and (3) initiating compression ignited or assisted combustion in the adjacent sub-chamber after segregation of those two sub-chambers has been eliminated.

BRIEF DESCRIPTION OF THE DRAWINGS

The invention will be described with reference to the following drawings in which like reference numerals refer to like elements, and wherein:

FIG. 2 illustrates a first phase in a multizone combustion chamber after a normal induction stroke in accordance with the present invention;

FIG. 3 illustrates a second phase in the multizone combustion chamber that segregates the combustion chamber into a primary chamber and a secondary chamber in accordance with the present invention;

FIG. 4 illustrates a third phase of the multizone combustion chamber showing an initial compression ignition in the primary chamber in accordance with the present invention;

FIG. 5 illustrates a fourth phase of the multizone combustion chamber showing a rapid combustion in the primary chamber in accordance with the present invention;

FIG. 6 illustrates a fifth phase of the multizone combustion chamber further showing the development of the rapid combustion in accordance with the present invention;

FIG. 7 illustrates a sixth phase of the multizone combustion chamber showing communication between the primary chamber and the secondary chamber, which initiates secondary chamber combustion, in accordance with the present invention;

FIG. 8 illustrates a seventh phase of the multizone combustion chamber showing the secondary chamber being forced to compression ignite due to pressure and temperature increases initiated by the primary chamber;

DETAILED DESCRIPTION OF PREFERRED EMBODIMENTS

Briefly, in accordance with the present invention, there is disclosed one example of an internal combustion engine to which the invention is applied. The internal combustion engine is a compression ignition engine.

Figure 1:
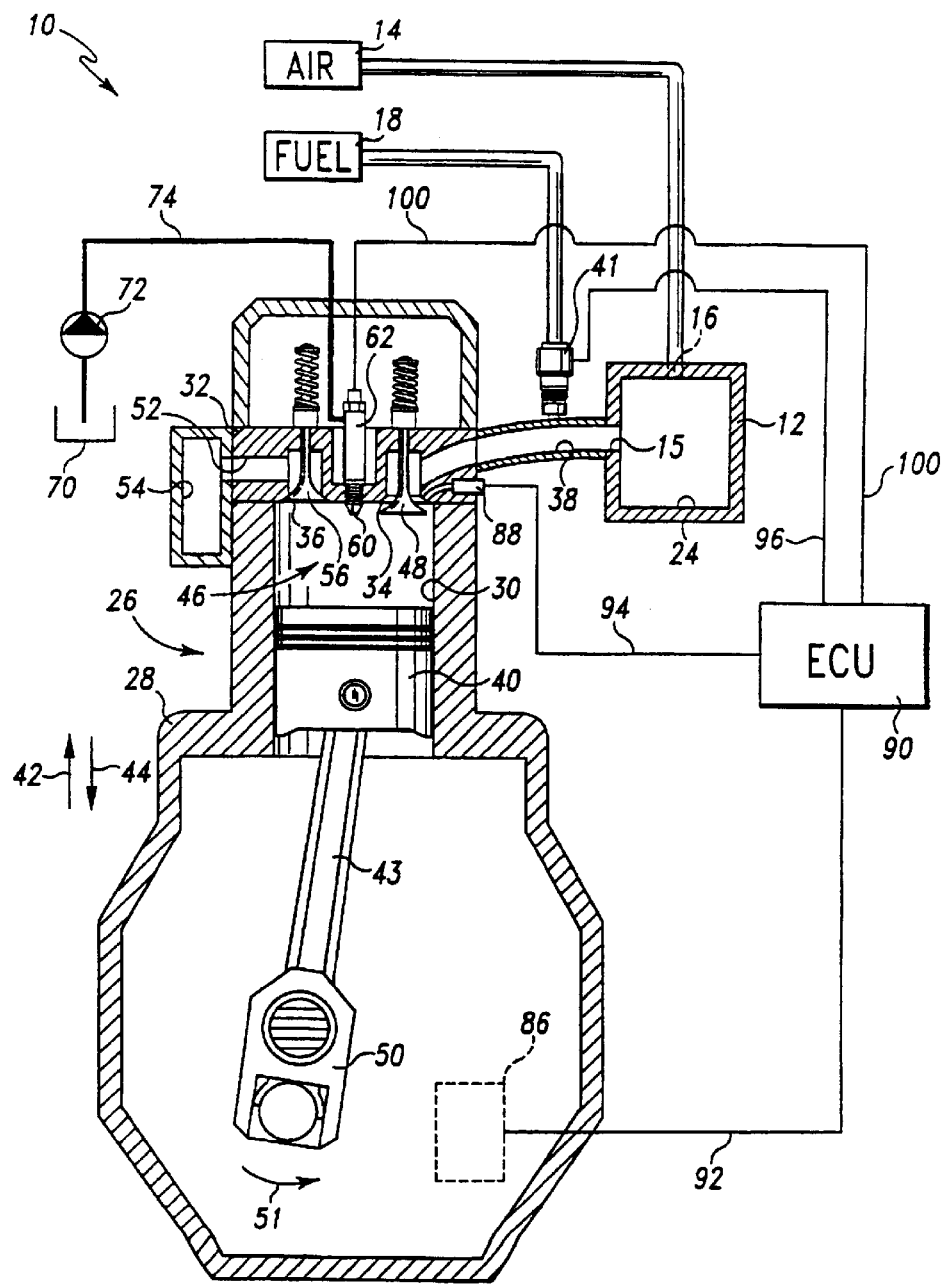
FIG. 1 illustrates a cross sectional view of a conventional internal combustion engine.

FIG. 1 shows a conventional internal combustion engine. The engine assembly 10 includes a plenum member 12, and an air source 14. The plenum member 12 has an inlet opening 16, and an exit opening 15 defined therein. The air source 14 supplies air to the inlet opening 16. The air from the air source 14 advances into a plenum chamber 24 defined in the plenum member 12 via the inlet opening 16.

The engine assembly 10 further includes a fuel combustion assembly or cylinder assembly 26. The cylinder assembly 26 includes a block 28 having a piston cylinder 30 defined therein. A cylinder head 32 is secured to the block 28. The cylinder head 32 has an intake port 34, an exhaust port 36, and a fuel injector opening 60 defined therein. An intake conduit 38 places the intake port 34 in fluid communication with the exit opening 15 of the plenum member 12. An exhaust conduit 52 places the exhaust port 36 in fluid communication with an exhaust manifold 54.

The engine assembly 10 further includes a piston 40 that translates in the piston cylinder 30 in the general reciprocating direction of arrows 42 and 44. During an intake stroke, the piston 40 is advanced in the general direction of arrow 44 thereby creating a low pressure in the combustion chamber 46. This low pressure draws air downwardly into the combustion chamber 46. As the piston 40 moves downwardly in the general direction of arrow 44 (to the position shown in FIG. 1), a connecting rod 43 urges a crankshaft 50 to rotate in the general direction of arrow 51. Subsequently, as the crankshaft 50 continues to rotate in the general direction of arrow 51, the crankshaft 50 urges the connecting rod 43 and the piston 40 in the general direction of arrow 42 to return the piston 40 to an uppermost position (not shown).

Advancing to a compression stroke, the intake valve 48 and the exhaust valve 56 are both positioned in their respective closed positions. As the piston 40 moves upward in the general direction of arrow 42, it compresses the air in the combustion chamber 46. The pressure in the combustion chamber 46 rises as the air is compressed by the piston 40 advancing from the beginning of the compression stroke (or 180 degrees before top dead center (TDC)) toward the end of the compression stroke (or 0 degrees before TDC).

The piston 40, the piston cylinder 30, and the cylinder head 32 cooperate so as to define the combustion chamber 46. In particular, when the piston 40 is advanced in the direction of arrow 42 (toward TDC), the volume of the combustion chamber 46 is decreased. Alternatively, when the piston 40 is advanced in the general direction of arrow 44 (toward bottom dead center (BDC)), the volume of the combustion chamber 46 is increased as shown in FIG. 1.

The engine assembly 10 further includes a fuel source 18 in fluid communication with the intake conduit 38. A fuel supply valve 41 controls the amount of fuel (gas or liquid) advanced to the intake conduit 38. In particular, the fuel supply valve 41 moves between an open position which advances the fuel to the intake conduit 38 and a closed position which prevents advancement of the fuel to the intake conduit 38. It should be appreciated that the amount of fuel advanced by the fuel valve 41 controls the ratio of air to fuel, or air-fuel ratio, advanced to the combustion chamber 46. Specifically, if it is desired to advance a leaner mixture to the combustion chamber 46, the fuel valve 41 is operated to advance less fuel to the intake conduit 38. On the other hand, if it is desired to advance a richer mixture of air and fuel to the combustion chamber 46, the fuel valve 41 is operated to advance more fuel to the intake conduit 38.

The intake valve 48 selectively places the plenum chamber 24 in fluid communication with the combustion chamber 46. The intake valve 48 is actuated in a known manner by a camshaft (not shown), a pushrod (not shown), and a rocker arm (not shown) driven by the rotation of the crankshaft 50. When the intake valve 48 is placed in the open position (shown in FIG. 1) air is advanced from the intake conduit 38 to the combustion chamber 46 via the intake port 34. When the intake valve 48 is placed in the closed position (not shown), air is prevented from advancing from the intake conduit 38 to the combustion chamber 46 since the intake valve 48 blocks fluid flow through the intake port 34.

The exhaust valve 56 selectively places the exhaust manifold 54 in fluid communication with the combustion chamber 46. The exhaust valve 56 is also commonly actuated in a known manner by a camshaft (not shown), a pushrod (not shown), and a rocker arm (not shown), each of which are driven by the rotation of the crankshaft 50. When the exhaust valve .56 is placed in the open position (not shown) exhaust gases are advanced from the combustion chamber 46 to the exhaust manifold 54 via a fluid path that includes the exhaust port 36 and the exhaust conduit 52. When the exhaust valve 56 is placed in the closed position (shown in FIG. 1) exhaust gases are prevented from advancing from the combustion chamber 46 to the exhaust manifold 54 since the exhaust valve 56 blocks fluid flow through the exhaust port 36.

The engine assembly 10 includes a fuel reservoir 70. A fuel pump 72 draws low pressure fuel from the fuel reservoir 70 and advances high pressure fuel to a fuel injector 62 via the fuel line 74. The fuel injector 62 is positioned in the injector opening 60 and is operable to inject a quantity of fuel into the combustion chamber 46 through the injector opening 60. In particular, the fuel injector 62 injects fuel into the combustion chamber 46 upon receipt of an injector control signal on a signal line 100 by an engine control unit 90.

The engine assembly 10 includes a crank angle sensor 86 and a pressure sensor 88. The crank angle sensor 86 measures the instantaneous position of the crankshaft 50 and generates a crank angle signal in response thereto. The pressure sensor 88 is mounted on the cylinder head 32 and is in fluid communication with the combustion chamber 46. The pressure sensor 88 measures the instantaneous pressure in the combustion chamber 46 and generates a pressure signal in response thereto.

The engine control unit 90 is operative to receive crank angle signals from the crank angle sensor 86 via the signal line 92 and pressure signals from the pressure sensor 88 via the signal line 94. The engine control unit 90 then generates the injector control signal which is sent to the fuel injector 62 via the signal line 100 that controls the quantity and timing of fuel injected by the fuel injector 62. The engine control unit 90 is further operable to control the fuel supply valve 41. Fuel control signals are sent to the fuel supply valve 41 via the signal line 96 causing the fuel supply valve 41 to control the air-fuel ratio of the air and fuel mixture advanced to the combustion chamber 46.

In operation, the cylinder assembly 26 operates in a four stroke cycle. The first stroke is an intake stroke, during which the exhaust valve 56 is positioned in the closed position and the intake valve 48 is positioned in the open position.

Various types of fuel can be used in the combustion process and can include any one of the following group of fuels: oxygenated, gasolines, diesel fuel, crude oil, lubricating oil, an emulsion of water and diesel fuel, any hydrogen-based or hydrocarbon-based fuel. For more details on internal combustion engines, see, for example, U.S. Pat. No. 6,032,617 to Willi et al., the entire disclosure of which is incorporated herein by reference.

Figure 11:
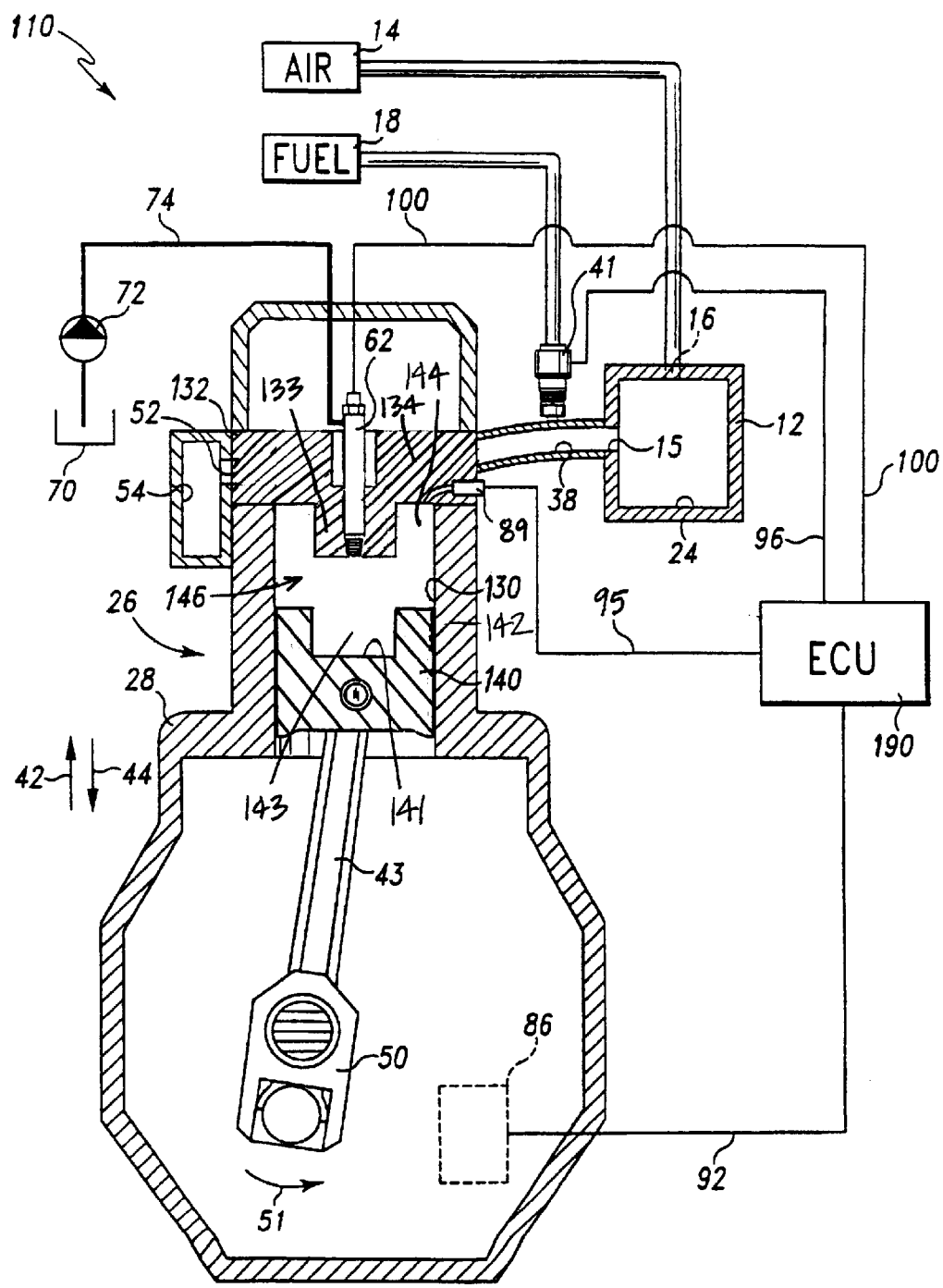
FIG. 11 illustrates a cross sectional view of an internal combustion engine in accordance with a preferred embodiment of the present invention.

The present invention seeks to provide an improved internal combustion engine having a multizone chamber, i.e., having at least two chambers as illustrated in FIG. 11, which shows a preferred embodiment of the present invention. The combustion chamber 146 of a reciprocating engine 110 defines a multizone chamber (i.e., the chamber 146 has two sub-chambers (a primary and a secondary chamber)) when a piston 140 is moved to a predetermined position near top-dead-center (TDC) of the piston stroke. For sake of clarity, the intake and exhaust valves are not shown. Similar reference numbers indicate similar elements.

FIGS. 2 and 11 illustrate a simplistic exemplary embodiment of the invention. The piston 140, the piston cylinder 130, and the cylinder head 132 define a multizone combustion chamber 146.

In particular, the piston 140 is a cup shape, having a central recess 141 surrounded by a circumferential protruding wall 142 portion of the piston 140. The cylinder head 132 is configured to matingly receive the cup-shape of the piston 140. The cylinder head 132 has a central protruberance 133 surrounded by a circumferential recess 134. The central recess 141 is adapted to slidingly receive the central protruberance 133, and the circumferentially protruding wall 142 is adapted to be slidingly received between the piston cylinder 130 and the central protruberance 133 and the recess 134.

Referring to FIG. 2, inner piston rings 148 and outer piston rings 147 can be located on the piston to seal and to control frictional forces acting between the contacting surfaces of the piston 140, the cylinder head 132 and the piston cylinder 130. Alternatively, outer piston rings 149 (shown in hidden lines in FIG. 2) can also be located on the central protruberance 133 of the cylinder head 132 instead of providing the inner piston rings 148. Implementation of (i.e., the need for) the piston rings 147, 148, 149 may depend on various factors, including but not limited to, the type of engine, cost efficiency and the amount of leakage allowed. Accordingly, the piston rings are not essential for all embodiments.

Referring to FIG. 3, as the piston 140 moves in the direction of arrow 42, a primary chamber 143 and a secondary chamber 144 are defined and sealed from each other to prevent fluid communication therebetween. The primary chamber 143 is defined by the central recess 141, the central protruberance 133 and the wall 142. The secondary chamber 144 is defined by the wall 142, the central protruberance 133 and the recess 134 of the cylinder head 132. Although only a primary chamber 143 and a secondary chamber 144 are shown and described, the combustion chamber 46 can be designed to define greater than two sub-chambers.

The primary chamber 143 traps a predetermined fraction of fuel/air mass 150 (or combustible gas) of the total fuel/air mass (or mixture) in the combustion chamber 146, and the secondary chamber 144 traps a remaining fraction of fuel/air mass 151 (or remaining combustible gas) of the total fuel/air mass. Ignition can be initiated in any one of the segregated chambers by compression ignition. However, for purposes of illustration, in this embodiment the primary chamber 143 is the initial combustion chamber.

The design of the components which segregate the primary chamber 143 and the secondary chamber 144 set a predetermined time at which the fuel/air mass 151 in the secondary chamber 144 is combusted. In the illustrated, preferred embodiment, the central protruberance 133 protrudes (beyond the base surface of recess 134) by an amount that is greater than an amount by which the protruding circumferential portion 142 protrudes (beyond the base surface of recess 141). Accordingly, the compression ratio of the primary chamber 143 is greater than the compression ratio of the secondary chamber.

FIGS. 2–8 illustrate a preferred multiphase sequence of the internal combustion processes. An object of this embodiment is to initiate combustion in the primary chamber 143 while delaying combustion in the secondary chamber 144.

Specifically, FIG. 2 illustrates a first phase, which begins after a normal induction stroke, in which air is introduced into the combustion chamber 146. The first phase represents an early compression process. Fuel can be delivered and mixed into the combustion system during any phase, i.e., before and during the first phase, through valve 41 and/or fuel injector 62. The delivered fuel can also be a premixed fuel-oxidizer charge or a non-premixed fuel-oxidizer charge. If fuel is injected directly to the combustion chamber, it is an object of the invention to inject the fuel and the air into the combustion chamber 146 with sufficient time such that the air-fuel mixture is substantially homogenous before it is compression ignited.

FIG. 3 illustrates a later, second phase in the compression stroke of the combustion chamber 146. This phase illustrates the initiation of chemical reactions within the unburned fuel/air masses 150, 151 in the primary chamber 143 and the secondary chamber 144 due to compression heating. At this phase, the combustion chamber 146 is separated into two (or can be more) individual combustion chambers (i.e., the primary chamber 143 and the secondary chamber 144). Separation of the combustion chamber 146 is obtained as a result of the combined effect of piston motion and the design of the combustion chamber. The predetermined fraction of fuel/air mass 150 trapped in the primary chamber 143 and the remaining fraction of fuel/air mass 151 trapped in the secondary chamber 144 can be the same or different. The amount of the predetermined fraction of fuel/air mass 150 trapped in the primary chamber 143 and the remaining fraction of fuel/air mass 151 trapped in the secondary chamber 144 is determined by the volume of fuel/air mass in the primary chamber 143 and the secondary chamber 144 just before each of the chambers are segregated from each other. The amount of fuel/air mass 150 in the primary chamber 143 is sufficient for compression ignition. The fraction of overall potential combustion energy trapped within the primary chamber 143 and the secondary chamber 144 is set by engine design.

An ignition threshold and a compression ratio of the primary chamber 143 and the secondary chamber 144 depend upon numerous factors including, e.g.: the dimension of the primary chamber 143; the dimension of the secondary chamber 144; the type of fuel being used; the fuel-air mixture (stratification) in each of the chambers 143, 144; the predetermined fraction of fuel/air mass 150 in the primary chamber 143; the remaining fraction of fuel/air mass 151 in the secondary chamber 144; whether the engine control unit 190 performs feedback control using the pressure measured by the pressure sensor 88 and the temperature measured by a temperature sensor 89; a volume of the primary chamber 143; a volume of the secondary chamber 144; an engine load and an engine speed; etc.

The ignition threshold of the primary chamber 143 can be decreased (causing a higher propensity for ignition) by increasing the compression ratio of the primary chamber 143. This can be effected, for example, by reducing the top-dead-center volume of the primary chamber 143. One way of achieving this is by increasing the protuberance depth of protuberance 133, or by decreasing the depth of the central recess 141. The ignition threshold of the secondary chamber 144 can also be increased or decreased in a manner similar to that described above with respect to the primary chamber 143. In particular, by reducing the top-dead-center volume of the secondary chamber 144, the ignition threshold of the secondary chamber 144 can be decreased (causing a higher propensity for ignition). This can be accomplished by increasing the protrusion of the protruding circumferential portion 142, or by decreasing the depth of the combustion chamber 146.

FIG. 4 illustrates a third phase where the predetermined fraction of fuel/air mass 150 trapped within the primary chamber 143 undergoes a compression ignition process. When compression ignition is undertaken, rapid combustion of the predetermined fraction of fuel/air mass 150 in the primary chamber 143 occurs. The size of the primary chamber 143 modulates the amount of energy trapped in the primary chamber 143 so that when the predetermined fraction of fuel/air mass 150 ignites, the pressure and temperature that is achieved can be controlled through design. The pressure required to ignite the predetermined fraction of fuel/air mass 150 is a function of thermodynamic interaction.

Primary ignition is initiated in the primary chamber 143 by compression ignition. By design, the primary chamber 143 and the secondary chamber 144 may have the same or different compression ratio values. Likewise, a peak combustion pressure and temperature are also limited by the dimension parameters and the compression ratio of the primary chamber 143 and the secondary chamber 144.

FIG. 5 illustrates a fourth phase where the compression ignition process proceeds to a rapid combustion process within the primary chamber 143. Since the primary chamber 143 is being utilized as an ignition control for the secondary chamber 144, the timing after TDC is not necessary.

FIG. 6 illustrates a fifth phase where the predetermined fraction of fuel/air mass 150 has been converted to a high pressure, high temperature, combusting gas 150A within the primary chamber 143. The fifth phase occurs after TDC, when the piston 140 is moving in the direction of a down stroke 44. In this fifth phase, the combusting gas 150A continues to expand and remains segregated from the remaining fuel/air mass 151 (or remaining combustible gas) in the secondary chamber 144.

FIG. 7 illustrates a sixth phase where the piston 140 has moved to a predetermined position where segregation of the primary chamber 143 and secondary chamber 144 is eliminated. The sixth phase occurs after TDC, as the piston continues to move in the direction of a down stroke 44. In this phase, combustion of the remaining fraction of the fuel/air mass 151 in the secondary chamber 144 is initiated. FIG. 7 shows the combusting gas 150A from the primary chamber 143 thermodynamically communicating with the remaining fuel/air mass 151 of the secondary chamber 144 and causing it to be converted into a remaining combusting gas 151A. Thermodynamic communication may include direct flame contact from the combusting gas 150A communicating from the primary chamber 143 to the secondary chamber 144.

In particular, after the primary chamber 143 and secondary chamber 144 have been desegregated and the combusting gas 150A of the primary chamber 143 is allowed to communicate with the secondary chamber 144, the combusting gas 150A in the primary chamber 143 and the thermodynamic state of the primary chamber 143 is used as the ignition source for the remaining fuel/air mass 151 in the secondary chamber 144. A predetermined time at which the fraction of the remaining fuel/air mass 151 in the secondary chamber 144 is combusted is a function of the dimensional parameters and design of the components which segregate the primary chamber 143 from the secondary chamber 144.

FIG. 8 illustrates a seventh phase where all of the remaining fuel/air mass 151 of the secondary chamber 144 has been ignited and converted into a combusting gas 151A. Ignition of the secondary chamber can be by compression ignition, direct flame contact, or a combination thereof.

Combustion of the remaining fuel/air mass 151 in the secondary chamber 144 occurs in the following manner. First, the combusting gas 150A in the primary chamber 143 acts as a direct ignition source to the remaining fuel/air mass 151 in the secondary chamber 144. A turbulent flame-front is created within the secondary chamber 144 at a position where the chambers initially communicate with each other, as shown in the sixth phase of FIG. 7. Second, the sudden expansion of the combusting gas 150A from the primary chamber 143 into the secondary chamber 144, causes a sudden rise in the temperature and pressure in the secondary chamber 144. This process can lead to auto-ignition and rapid combustion of the unburned remaining fuel/air mass 151 of the secondary chamber 144. FIGS. 7–8 depict the auto-ignition and rapid combustion of the fuel/air mass 151 along the periphery of the secondary chamber 144 and throughout the entire multizone combustion chamber 146.

Figure 9:
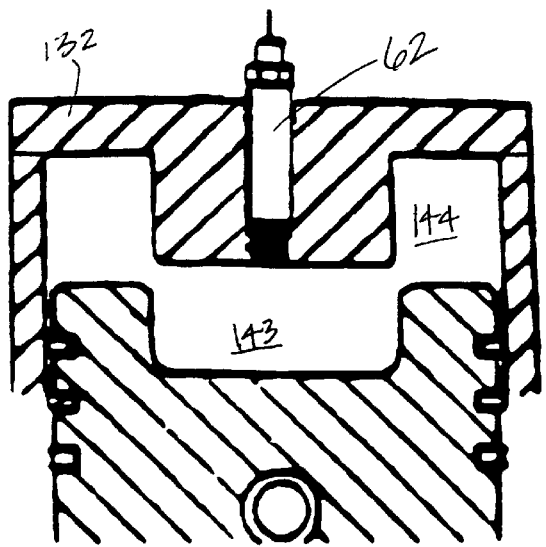
FIG. 9 illustrates a fuel injector location in accordance with the present invention.

In accordance with the present invention, fuel can be injected at any location in the multizone combustion chamber 146. FIGS. 9 and 11 illustrate a fuel injector 62 being located in the cylinder head 132 for initially supplying fuel to the primary chamber 143.

Figure 10:
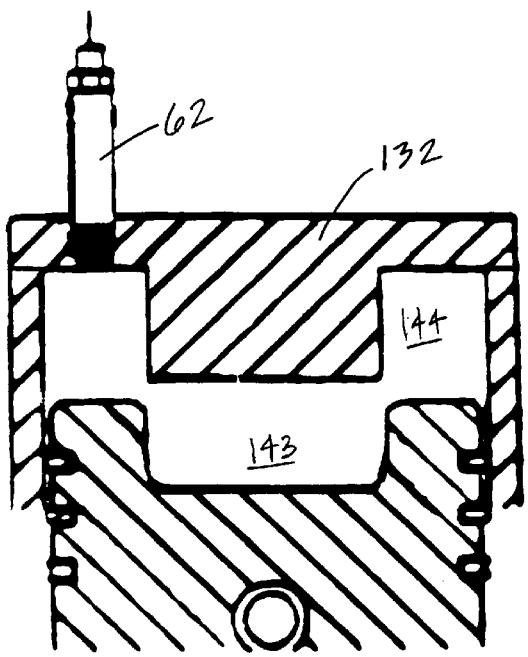
FIG. 10 illustrates an alternate fuel injector location in accordance with the present invention.

FIG. 10 illustrates an alternate fuel injector 62 location in accordance with the present invention. The fuel injector 62 is located in the recess 134 of the cylinder head 132 for initially supplying fuel to the secondary chamber 144. As mentioned before, the multizone combustion chamber 146 can incorporate more than two combustion chambers. Accordingly, it is also possible to inject fuel into any one of numerous sub-chambers. Although the fuel can be initially injected into a portion of the chamber 146 associated with one of the sub-chambers, an air-fuel mixture is created in the primary chamber and all, or at least one other secondary chamber prior to segregation of the chambers.

As mentioned before, it is an aspect of the invention to provide a homogeneous air-fuel mixture of fuel and air prior to compression ignition. The fuel and air can be mixed any number of ways. One way is to mix the fuel and air outside of the combustion chamber 146 into a substantially homogeneous air-fuel mixture and then draw it into the combustion chamber 146. Referring to FIG. 9, another way is to directly inject the fuel into the middle of the combustion chamber 146 while the piston 140 is being drawn to a location near bottom-dead-center such that all of the fuel is allowed to mix homogeneously with all of the air in the combustion chamber 146. Thereafter, the primary chamber 143 is segregated from the secondary chamber 144, whereby a homogeneous air-fuel mixture is provided in both the primary chamber 143 and the secondary chamber 144. Alternatively, if it is desirable to stratify the fuel, i.e., to have more fuel in the primary chamber 143 than in the secondary chamber 144 (after segregation), additional fuel can be injected into the primary chamber a predetermined time later (e.g., after segregation or as the piston is nearing the segregation stage as shown in FIG. 3) so that all of the fuel is not allowed to mix with all of the air throughout the entire combustion chamber 146 before segregation. In this manner, more fuel would be contained in the primary chamber 143, and less fuel would be contained in the secondary chamber 144. At the time of compression ignition, the homogeneous air-fuel mixture in the primary chamber 143 would have an air/fuel ratio different from the air/fuel ratio of the homogeneous air-fuel mixture in the secondary chamber 144. In accordance with another way of mixing, if the injector 62 is located so that it directly injects into the secondary chamber 144 (as shown in FIG. 10), the amount of fuel contained in the secondary chamber 144 could be adjusted to be more than the amount of fuel in the primary chamber 143. This can be obtained by injecting fuel just before the primary chamber 143 is segregated from the secondary chamber 144. In any one of these mixing techniques, and in accordance with the invention, injection of the fuel into the combustion chamber 146 occurs early enough so that all of the fuel can homogeneously mix with the air. The type of fuel that is used also will affect the time when that fuel is injected. For example, with a fuel such as gasoline, since the evaporation rate of the gasoline is higher than other fuels, gasoline may be injected later in time, such as when the piston 140 is close to a position where compression ignition of the gasoline occurs.

The engine control unit 190 is operable to monitor various parameters in the multizone combustion chamber to efficiently control the operation of the internal combustion process. FIG. 11, e.g., illustrates that in addition to the crank angle sensor 86 and the pressure sensor 88 mentioned in the engine assembly 10 of FIG. 1, the engine control unit 190 in this preferred embodiment is also operable to monitor a temperature in the combustion chamber 146 with a temperature sensor 89.

The temperature sensor 89 is mounted on the cylinder head 32 and is in communication with the combustion chamber 146. The temperature sensor 89 measures the instantaneous temperature in the combustion chamber 146 and generates a temperature signal that is processed in the engine control unit 190 to optimize the engine operation of the multizone combustion chamber. The engine control unit 190 is operative to receive temperature signals from the temperature sensor 89 via the signal line 95 and/or pressure signals from the pressure/sensor 88 via the signal line 94. The engine control unit 190 then generates the injector control signal which is sent to the fuel injector 62 via the signal line 100 that controls the quantity and timing of fuel injected by the fuel injector 62.

According to the present invention, the engine control unit 190 is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

Further, it is another aspect of the invention to include any fuel suitable for the combustion process including but not limited to, oxygenates, gasolines, diesel and hydrogen. Oxygenated fuel can be injected at any time during the compression process through the valve 41 or through the fuel injector 62.

Preferably, the sub-chambers (i.e., the primary chamber, the secondary chamber, etc.) are concentric, with the primary chamber being centrally located in order to have a balanced, most efficient combustion. However, other, non-concentric arrangements are possible. When more than two sub-chambers are provided, combustion would proceed from the primary chamber to the other chambers sequentially, or two or more of the other sub-chambers could perform combustion in unison. However, the primary chamber or chambers should always ignite first, so that the primary chamber 143 becomes the ignition source for subsequent secondary chambers. In accordance with the invention, more than one primary chamber can be linked to subsequent secondary chambers, such that all of the primary chambers will compression ignite at the same time and thereafter will subsequently ignite their respective secondary chambers. This would create a cascade effect between the combustion of at least one primary chamber and at least one subsequent secondary chamber, respectively. The cascade effect would be such that the net combustion energy release rate can be efficiently controlled. Unlike in conventional combustion chambers, where the net combustion energy release rate is uncontrolled, in accordance with this invention, where sequential combustion is occurring, it is possible to control the net combustion energy release rate because the combustion is separated into discreet controllable events.

The dimensions and relative volumes of the primary chamber(s) and the secondary chamber(s) is a function of the fuel utilized, and the fuel-air ratios trapped in the primary chamber(s) and secondary chamber(s).

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A multizone combustion chamber comprising:
   a cylinder;
   a cylinder head located at one end of the cylinder;
   a piston that reciprocates in the cylinder;
   an inlet that supplies a gas into the combustion chamber during an induction stroke of the piston; and
   an injector that supplies a fuel into the combustion chamber;
   wherein the combustion chamber sealingly defines a primary chamber and at least a secondary chamber when the piston is located in a predetermined position near the cylinder head, the primary chamber and the secondary chamber containing respective mixtures of the gas and the fuel prior to combustion, and being sized such that compression combustion is initiated in the primary chamber by compression of the gas/fuel mixture in the primary chamber, while delayed compression combustion occurs in the secondary chamber due to compression of the gas/fuel mixture in the secondary chamber.

2. The multizone combustion chamber of claim 1, wherein combustion in the secondary chamber is delayed until after the piston and the cylinder head have been separated by an amount that places the primary chamber and the secondary chamber in fluid communication with each other.

3. The multizone combustion chamber of claim 2, wherein the primary chamber is selectively sealed and unsealed from the secondary chamber by a motion of the piston.

4. The multizone combustion chamber of claim 1, wherein the primary chamber is sealed from the secondary chamber by at leas one seal.

5. The multizone combustion chamber of claim 1, wherein:
   the piston has a central recess surrounded by a protruding circumferential wall; and
   the cylinder head has a central protruberance surrounded by a circumferential recess that matingly receives the protruding circumferential wall of the piston.

6. The multizone combustion chamber of claim 5, wherein:
   the primary chamber is defined between the central recess and, the central protruberance; and
   the secondary chamber is defined between the protruding circumferential wall and the circumferential recess.

7. The multizone combustion chamber of claim 5, wherein the piston comprises:
   inner piston rings located in the central recess; and
   outer piston rings located between the piston and the cylinder,
   wherein the piston rings seal and control frictional forces acting between adjacent translating surfaces.

8. The multizone combustion chamber of claim 5, wherein the central protruberance has piston rings disposed around the central protruberance to seal and to control frictional forces acting between adjacent translating surfaces.

9. The multizone combustion chamber of claim 5, wherein the central protruberance protrudes by an amount that is greater than an amount by which the protruding circumferential wall protrudes.

10. The multizone combustion chamber of claim 1, wherein a remaining fuel/gas mass within the secondary chamber is ignited by combined compression ignition and direct flame contact from a combusting gas communicating from the primary chamber after passage of the combusting gas between the primary chamber and the secondary chamber.

11. The multizone combustion chamber of claim 10, wherein a time at which the secondary chamber is ignited is controlled in accordance with a dimension of the primary chamber, a dimension of the secondary chamber and a motion of the piston.

12. The multizone combustion chamber of claim 1, wherein a compression ratio of the primary chamber and a compression ratio of the secondary chamber is based on the dimension of the primary chamber and the secondary chamber.

13. The multizone combustion chamber of claim 12, wherein the primary chamber traps a predetermined fraction of fuel/gas mass that is sufficient for compression ignition prior to initiating compression combustion in the secondary chamber thereafter.

14. The multizone combustion chamber of claim 12, wherein the compression ratio of the primary chamber and the compression ratio of the secondary chamber are different.

15. The multizone combustion chamber of claim 12, wherein a peak combustion pressure and a peak combustion temperature are a function of dimensions of the primary chamber and the secondary chamber and the compression ratio of the predetermined fraction of fuel/gas mass in the primary chamber.

16. The multizone combustion chamber of claim 1, wherein during a piston downstroke and at the predetermined position, segregation of the primary chamber and the secondary chamber is eliminated and combustion of the gas/fuel mixture in the secondary chamber occurs when a combusting gas in the primary chamber communicates as an ignition source with the gas/fuel mixture in the secondary chamber.

17. The multizone combustion chamber of claim 16, wherein a predetermined time at which the gas/fuel mixture in the secondary chamber is combusted is a function of at least one parameter of the primary chamber and the secondary chamber.

18. The multizone combustion chamber of claim 1, wherein an effective compression ratio of the primary chamber and an effective compression ratio of the secondary chamber are based on:
   a dimension of the primary chamber and a predetermined fraction of fuel/gas mass in the primary chamber, and
   a dimension of the secondary chamber and a remaining fuel/gas mass in the secondary chamber.

19. An internal combustion engine having a multizone combustion chamber with a cylinder, a cylinder head located at one end of the cylinder, a piston that reciprocates in the cylinder, an inlet that supplies a gas into the combustion chamber during an induction stroke of the piston, and an injector that supplies a fuel into the combustion chamber, wherein the combustion chamber comprises:
   at least two combustion sub-chambers defined when the piston is moved to a predetermined position near the cylinder head and the at least two combustion sub-chambers are sealed from each other; and
   wherein combustion is initiated in a first one of the combustion sub-chambers while delaying combustion from occurring in any of the other combustion sub-chambers, until the piston and the cylinder head return to the predetermined position and are subsequently placed in fluid communication with each other so that an ignited gas/fuel mixture can communicate thermodynamically from the one combustion sub-chamber to an adjacent one of the other combustion sub-chambers.

20. The internal combustion engine of claim 19, wherein a compression ratio of the one combustion sub-chamber provides compression ignition of a gas/fuel mixture therein.

21. The internal combustion engine of claim 20, wherein a pressure and a temperature of the combusted gas/fuel mixture within the one combustion sub-chamber are controlled in accordance with at least one design variable including a chamber volume and the compression ratio.

22. A method for combustion in an internal combustion engine having a multizone combustion chamber with a cylinder, a cylinder head located at one end of the cylinder, a piston that reciprocates in the cylinder, an inlet that supplies a gas into the combustion chamber during an induction stroke of the piston, and an injector that supplies a fuel into the combustion chamber, the method comprising the steps of:
   segregating the combustion chamber into at least two sub-chambers when the piston is moved into a predetermined position near the cylinder head;
   initiating compression combustion in one of the sub-chambers, which has been sealed off from an adjacent sub-chamber, while preventing combustion from occurring in the adjacent sub-chamber; and
   initiating combustion in the adjacent sub-chamber after the segregation of the at least two sub-chambers has been eliminated.

23. The method of claim 22, further comprising:
   designing sizes of the at least two sub-chambers such that a predetermined fraction of fuel/gas mass in the one sub-chamber is sufficient for initiating combustion prior to initiating combustion in the adjacent sub-chamber thereafter.

24. The method of claim 22, wherein the initiation of combustion in the adjacent sub-chamber is caused by thermodynamic communication between the fuel/gas mass that has been ignited in the one sub-chamber and the fuel/gas mass in the adjacent sub-chamber.

* * * * *